US011462960B2

(12) United States Patent
Pan et al.

(10) Patent No.: US 11,462,960 B2
(45) Date of Patent: Oct. 4, 2022

(54) ROTOR WITH FIRST AND SECOND PERMANENT MAGNETS HAVING SUPPORT MEMBERS AND SLOTS

(71) Applicant: HIWIN MIKROSYSTEM CORP., Taichung (TW)

(72) Inventors: Cheng-Hsun Pan, Taichung (TW); Cheng-Te Chi, Taichung (TW); Ruei-Bin Hsiao, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 353 days.

(21) Appl. No.: 16/700,959

(22) Filed: Dec. 2, 2019

(65) Prior Publication Data
US 2021/0167643 A1 Jun. 3, 2021

(51) Int. Cl.
*H02K 1/276* (2022.01)
*H02K 29/03* (2006.01)

(52) U.S. Cl.
CPC .............. *H02K 1/276* (2013.01); *H02K 29/03* (2013.01); *H02K 2213/03* (2013.01)

(58) Field of Classification Search
CPC ........ H02K 1/27; H02K 1/276; H02K 1/2766; H02K 1/2706; H02K 1/2786; H02K 16/00; H02K 16/04; H02K 21/12; H02K 2213/03; H02K 29/03
USPC .... 310/156.01, 156.53, 156.56, 156.57, 266, 310/269
See application file for complete search history.

(56) References Cited

U.S. PATENT DOCUMENTS

| 4,246,097 | A | * | 1/1981 | Pouillon | ................... B03C 1/03 209/214 |
| 4,252,328 | A | * | 2/1981 | Raj | .......................... F16J 15/43 9/17.006 |
| 4,252,353 | A | * | 2/1981 | Raj | ..................... G11B 19/2009 277/917 |
| 4,262,877 | A | * | 4/1981 | Lang | ................... F16K 31/0658 335/262 |
| 4,300,674 | A | * | 11/1981 | Davet | ..................... A47F 7/024 206/1.5 |
| 4,357,021 | A | * | 11/1982 | Raj | .......................... F16J 15/43 277/410 |
| 4,357,022 | A | * | 11/1982 | Raj | .......................... F16J 15/43 |
| 4,404,494 | A | * | 9/1983 | Heynisch | ............ H01J 23/0873 315/5.35 |
| 4,444,398 | A | * | 4/1984 | Black, Jr. | ................. F16J 15/43 277/410 |
| 4,478,424 | A | * | 10/1984 | Raj | .......................... F16J 15/43 277/928 |

(Continued)

FOREIGN PATENT DOCUMENTS

JP H08-275419 A * 10/1996

OTHER PUBLICATIONS

JPH08-275419A English Translation.*

*Primary Examiner* — Maged M Almawri
(74) *Attorney, Agent, or Firm* — Guice Patents PLLC

(57) ABSTRACT

A rotor apparatus for a permanent-magnet motor has the main technical feature of a ring rotor with its magnets arranged according to the Halback magnetic ring array. In addition, for a distance between magnets of a parallel array and the outer ring edge of the rotor, and for a diameter difference between the inner and outer diameters of the ring rotor, a ratio between said distance/said diameter difference is between 0.43 and 0.48.

12 Claims, 5 Drawing Sheets

(56) References Cited

U.S. PATENT DOCUMENTS

| | | | | | |
|---|---|---|---|---|---|
| 4,559,578 | A | * | 12/1985 | Praeg | H05H 7/04 315/501 |
| 4,613,392 | A | * | 9/1986 | Klar | B23P 19/08 156/235 |
| 4,783,775 | A | * | 11/1988 | Gijzen | G11B 7/093 250/201.4 |
| 4,795,168 | A | * | 1/1989 | Adams | F16C 33/78 277/390 |
| 4,806,766 | A | * | 2/1989 | Chisholm | H01J 37/14 250/311 |
| 4,817,964 | A | * | 4/1989 | Black, Jr. | F16J 15/43 29/451 |
| 4,829,211 | A | * | 5/1989 | Van Roosmalen | H01J 9/142 445/47 |
| 4,839,059 | A | * | 6/1989 | Leupold | H01F 7/0278 335/304 |
| 4,914,412 | A | * | 4/1990 | Engdahl | H01L 41/12 335/215 |
| 4,960,469 | A | * | 10/1990 | Tanigawa | H02K 15/03 148/101 |
| 4,991,836 | A | * | 2/1991 | Joffe | A63F 9/34 446/139 |
| 5,248,883 | A | * | 9/1993 | Brewer | H01J 49/0018 250/281 |
| 5,330,632 | A | * | 7/1994 | Sichmann | H01J 37/3405 204/298.18 |
| 5,332,948 | A | * | 7/1994 | True | H01J 25/34 315/5.35 |
| 5,379,000 | A | * | 1/1995 | Brewer | H01J 49/0018 315/307 |
| 5,432,658 | A | * | 7/1995 | Kajita | G11B 5/588 360/291.7 |
| 5,591,487 | A | * | 1/1997 | Ohtake | G11B 9/14 |
| 5,614,822 | A | * | 3/1997 | Sakamoto | F16C 41/007 324/174 |
| 5,820,032 | A | * | 10/1998 | Reiter | F02M 51/08 239/585.1 |
| 5,821,543 | A | * | 10/1998 | Moran | H01J 37/12 250/396 R |
| 5,889,215 | A | * | 3/1999 | Kilmartin | G01L 3/105 73/862.333 |
| 5,944,262 | A | * | 8/1999 | Akutagawa | F02M 61/168 239/585.4 |
| 5,954,342 | A | * | 9/1999 | Mikhalev | F16J 15/43 277/347 |
| 5,963,117 | A | * | 10/1999 | Ohashi | G01R 33/383 335/297 |
| 6,084,331 | A | * | 7/2000 | Reinhardt | H02K 5/141 310/239 |
| 6,160,343 | A | * | 12/2000 | Joung | H01J 29/703 313/430 |
| 6,211,673 | B1 | * | 4/2001 | Gerber | B82Y 35/00 360/110 |
| 6,223,512 | B1 | * | 5/2001 | Koltze | D01H 1/08 57/76 |
| 6,229,298 | B1 | * | 5/2001 | Sakamoto | G01P 3/488 324/174 |
| 8,030,816 | B2 | * | 10/2011 | Atarashi | H02P 6/16 310/156.36 |
| 8,373,325 | B2 | * | 2/2013 | Ichiyama | H02K 21/12 310/180 |
| 8,421,293 | B2 | * | 4/2013 | Yamashita | H02K 1/02 310/156.43 |
| 8,432,080 | B2 | * | 4/2013 | Murakami | H02K 1/2766 310/156.43 |
| 8,624,457 | B2 | * | 1/2014 | Sakai | H02K 1/2766 310/156.43 |
| 8,653,710 | B2 | * | 2/2014 | Takahashi | H02K 1/276 310/182 |
| 8,674,575 | B2 | * | 3/2014 | Sakai | H02K 1/2766 310/182 |
| 9,252,634 | B2 | * | 2/2016 | Kondou | H02K 21/12 |
| 9,331,532 | B2 | * | 5/2016 | Zhang | H02K 21/024 |
| 9,906,083 | B2 | * | 2/2018 | Cao | F04D 25/06 |
| 10,020,698 | B2 | * | 7/2018 | Kondou | H02K 1/276 |
| 10,594,179 | B2 | * | 3/2020 | Liu | H02K 21/14 |
| 2002/0180294 | A1 | * | 12/2002 | Kaneda | H02K 1/278 310/156.43 |
| 2002/0180295 | A1 | * | 12/2002 | Kaneda | H02K 1/278 310/156.43 |
| 2009/0251021 | A1 | * | 10/2009 | Atarashi | H02P 6/16 310/156.07 |
| 2010/0171385 | A1 | * | 7/2010 | Sakai | H02K 1/2766 310/156.43 |
| 2011/0084567 | A1 | * | 4/2011 | Ichiyama | H02K 21/042 310/181 |
| 2011/0121675 | A1 | * | 5/2011 | Yamashita | H02K 1/2786 310/154.25 |
| 2011/0309706 | A1 | * | 12/2011 | Takahashi | H02K 1/276 310/156.53 |
| 2014/0159532 | A1 | * | 6/2014 | Kondou | H02K 1/276 310/156.53 |
| 2017/0085143 | A1 | * | 3/2017 | Tanaka | H02K 29/03 |
| 2017/0117764 | A1 | * | 4/2017 | Wang | H02K 1/28 |
| 2018/0331591 | A1 | * | 11/2018 | Liu | H02K 1/2786 |
| 2021/0167643 | A1 | * | 6/2021 | Pan | H02K 1/276 |

* cited by examiner

ROTOR WITH FIRST AND SECOND PERMANENT MAGNETS HAVING SUPPORT MEMBERS AND SLOTS

BACKGROUND OF THE INVENTION

Field of the Invention

The technical field relates to a motor, in particular, to a rotor apparatus for a permanent-magnet motor.

Description of Related Art

With regard to a motor device with the application of electromagnetic technology, despite that the development of such technology is relatively mature, nevertheless, the development on how to enhance its performance and to reduce the energy consumption etc. are constantly under improvement. Since the introduction of Halback magnetic ring array by Klaus Halback in the twentieth century, its special magnet arrangement method, in comparison to the traditional magnet arrangement method, is able to significantly reduce the generation of the cogging torque and torque ripple effects of the motor, such that it is able to further improve the issue of motor vibration and noise. In addition, the magnetic self-shielding characteristic equipped by such magnetic ring array is able to also reduce the magnetic leakage of the motor, thereby reducing the magnetic interference of the motor to the external environment. In view of the above, it can be seen that the Halback magnetic ring array is able to enhance the performance of a motor.

Nevertheless, the research on the Halback magnetic ring array is still insufficient disclosed in the prior arts.

SUMMARY OF THE INVENTION

Accordingly, the primary objective of the present invention is to provide a rotor apparatus for a permanent-magnet motor, capable of increasing the motor torque, reducing magnetic leakage and reducing core loss.

In view of the above, to achieve the aforementioned objective, the present invention provides a rotor apparatus for a permanent-magnet motor, and its main technical feature relies in that its ring rotor is configured to include magnets arranged according to the Halback magnetic ring array. In addition, a distance between the parallel array of magnets and an outer ring edge of the rotor, and a diameter difference between an inner diameter and an outer diameter of the ring rotor, are configured in such way that a ratio of the distance/the diameter difference between the inner and outer diameters is between 0.43 and 0.48.

Furthermore, the ratio of the distance/the diameter difference between the inner and outer diameters is preferably between 0.44 and 0.46.

Moreover, an magnetic intensity of the parallel array in the Halback magnetic ring array is smaller than an magnetic intensity of the radial array in the Halback magnetic ring array.

DETAILED DESCRIPTION OF THE INVENTION

Figure 1:
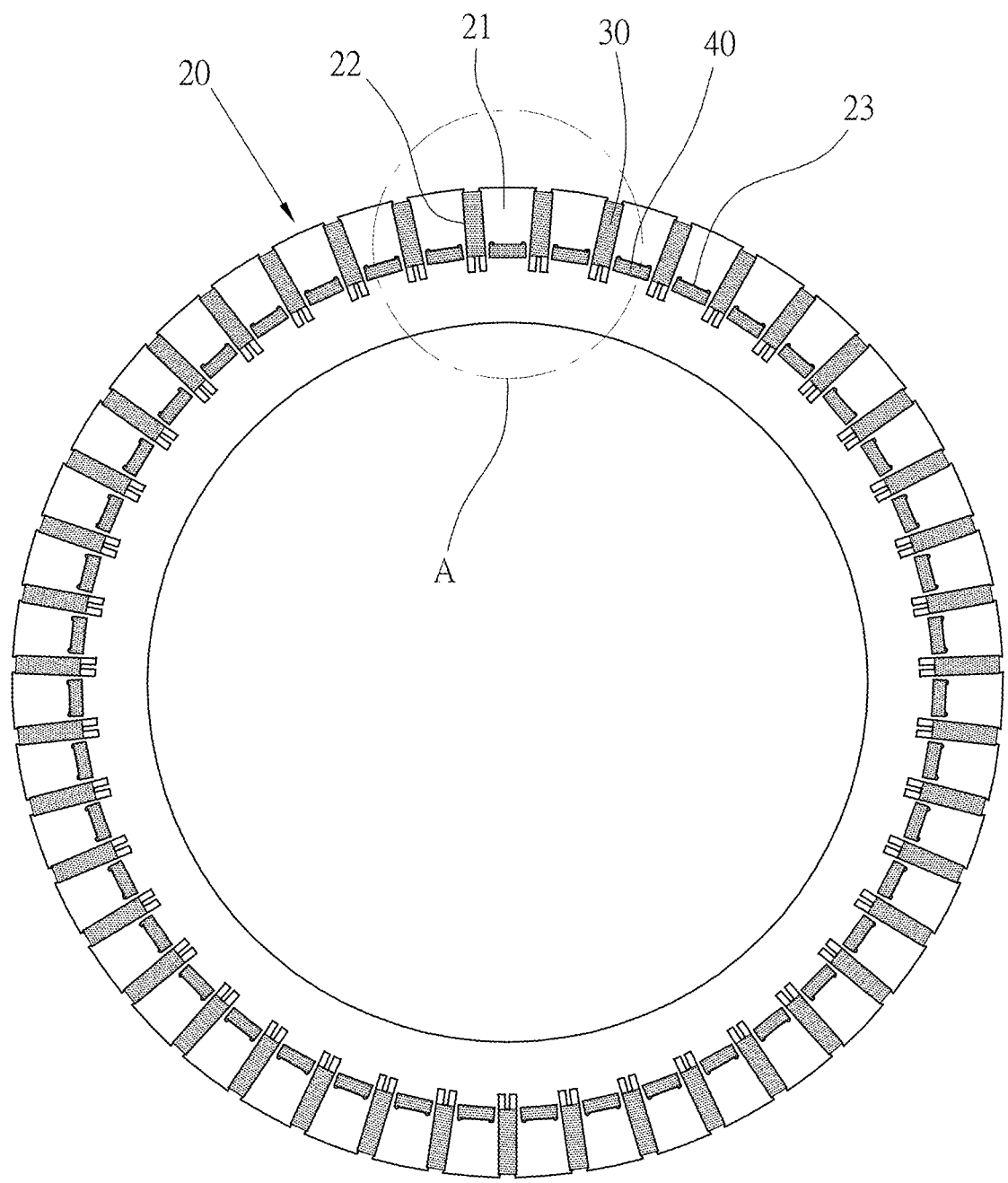
FIG. 1 is a plane view of a preferred embodiment of the present invention.
Figure 2:
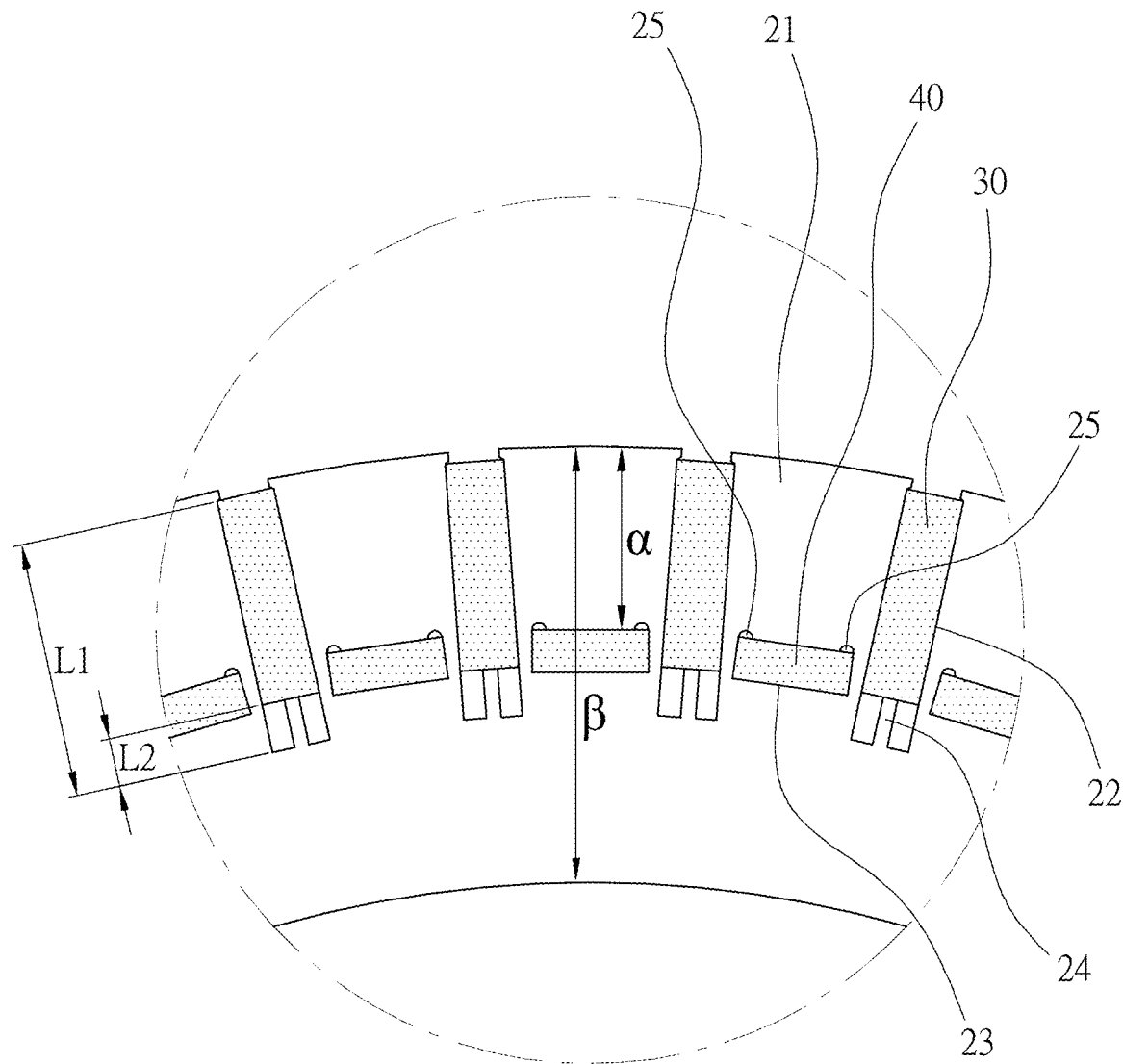
FIG. 2 is partially enlarged view of Area A in FIG. 1 according to a preferred embodiment of the present invention.

First, please refer to FIG. 1 and FIG. 2. According to a preferred embodiment of the present invention, a rotor apparatus (10) for a permanent-magnet motor is provided, mainly comprising a rotor (20), a plurality of first magnets (30) and a plurality of second magnets (40).

The rotor (20) includes a body (21) in a circular ring shape, a plurality of first slots (22) with a cross section of rectangular shape extends for a first length (L1) from an outer ring edge of the body (21) inward along the radial direction of the body (21), and a plurality of second slots (23) with a cross section of rectangular shape arranged in the body (21) and between two adjacent first slots (22) respectively. In addition, the long axis of each one of the second slots (23) is arranged perpendicular to the radial direction of the body, such that each one of the first slots (22) and each one of the second slots (23) are arranged in a crisscross pattern on the body (21).

Furthermore, the rotor (20) further comprises a plurality of supporting members (24) of slab shapes protruding on an extended rear end of each one of the first slots (22) respectively and extended for a second length (L2) shorter than the first length (L1) along the radial direction of the body (21) toward the slot opening direction of each one of the first slots (22), a plurality of pairs of alcoves (25) indented inward on two ends of the long axis of each one of the second slots (23) at a corner location of one side of the short axis, and perpendicular to the long axis of each one of the second slots (23).

Each one of the first magnets (30) is a rectangular block respectively and is inserted into each one of the first slots (22). In addition, one end of the long axis abuts against the extended rear end of the corresponding supporting member (24), and a length of each one of the first magnet (30) is shorter than a difference between the first length (L1) and the second length (L2), such that another end of the long axis of each one of the first magnets (30) can be submerged into the inner side of the slot opening of each one of the first slot (22) such that it is not protruded out of the outer ring side of the body (21).

Each one of the second magnets (40) is a rectangular block, and the magnetic intensity is smaller than the magnetic intensity of each one of the first magnets (30), and is inserted into each one of the second slots (23) respectively. In addition, the rectangular shape of each one of the second magnets (40) is identical with the rectangular shape of each one of the second slots (23) such that each one of the second magnets (40) can be firmly inserted inside each one of the second slots (23) respectively.

Figure 6:
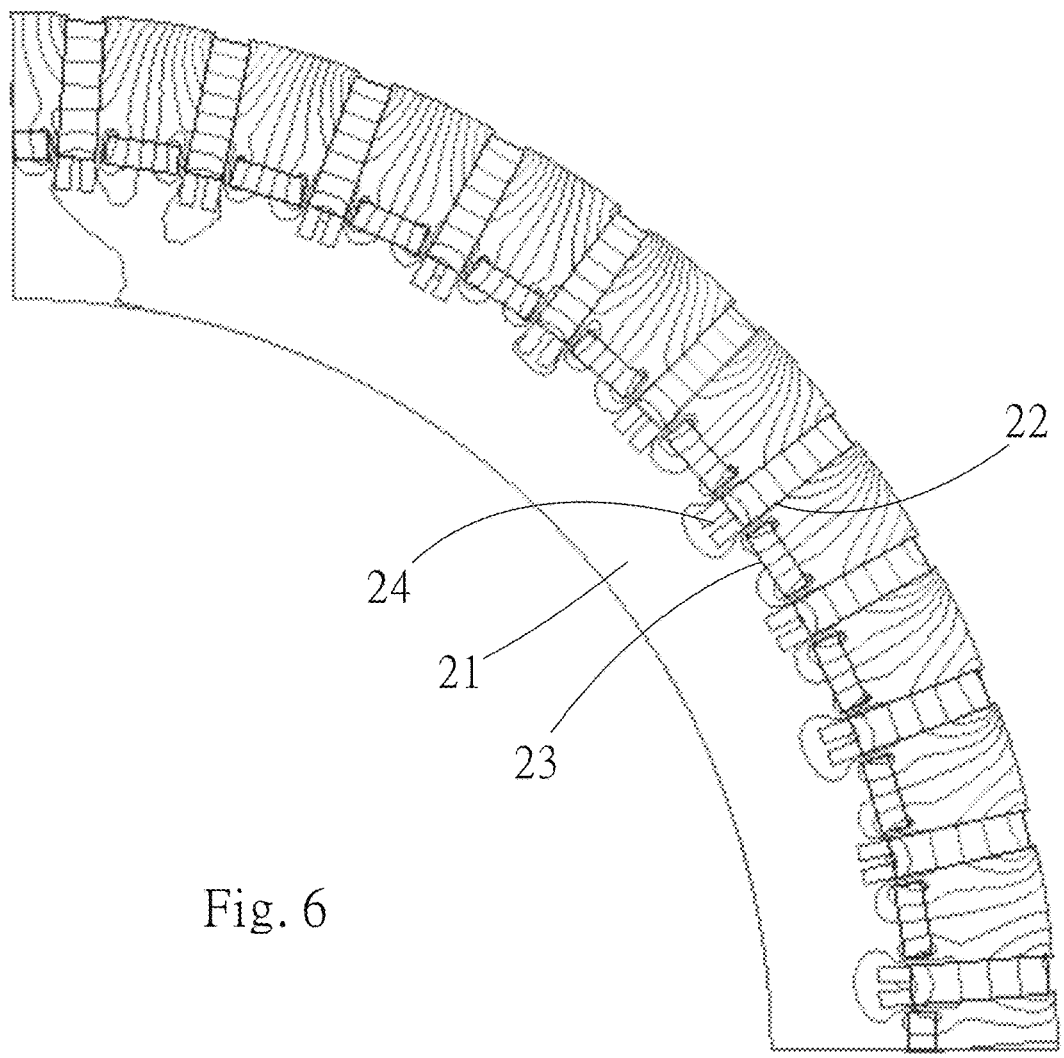
FIG. 6 is a magnetic flux density graph with the a/0 value of 0.48 according to a preferred embodiment of the present invention.

As shown in FIGS. 1, 2, and 6, an innermost end of each said first magnet (30) of said plurality of first magnets (30) is located a distance from the inner diameter of the body (21) that is greater than a distance that an innermost end of each said second magnet (40) of said plurality of second magnets (40) is located from the inner diameter of the body (21).

Figure 3:
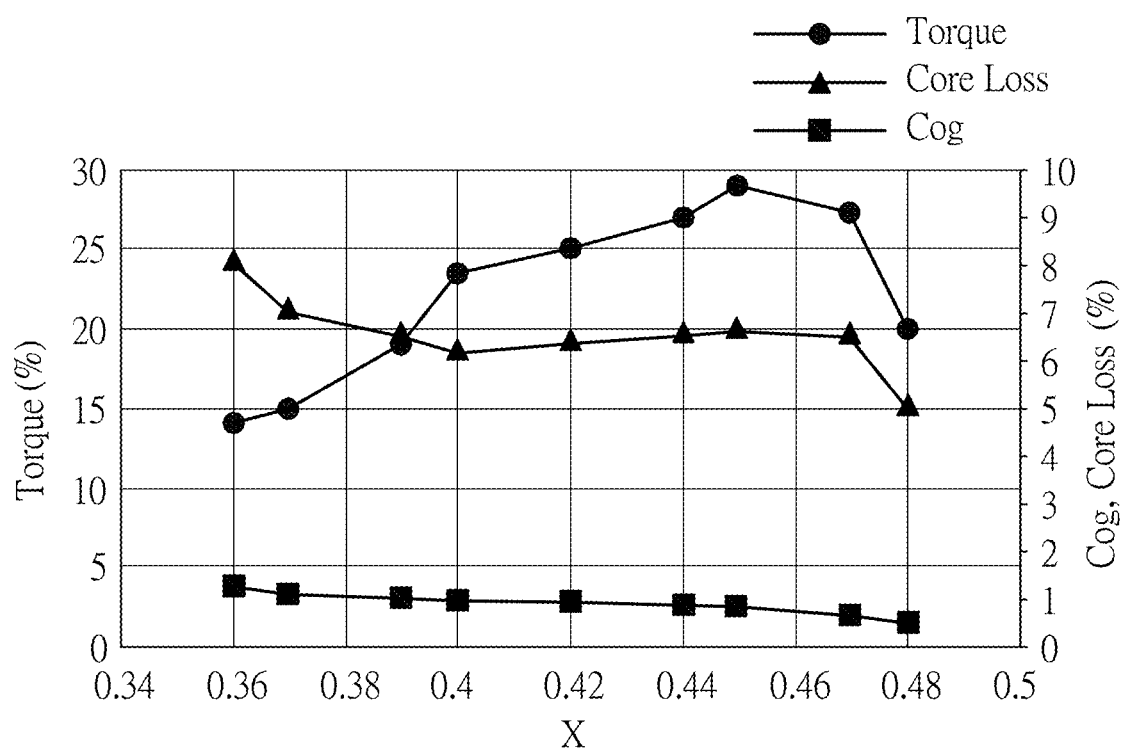
FIG. 3 is a graph illustrating torque, core loss and cog of different a/0 values according to a preferred embodiment of the present invention.
Figure 4:
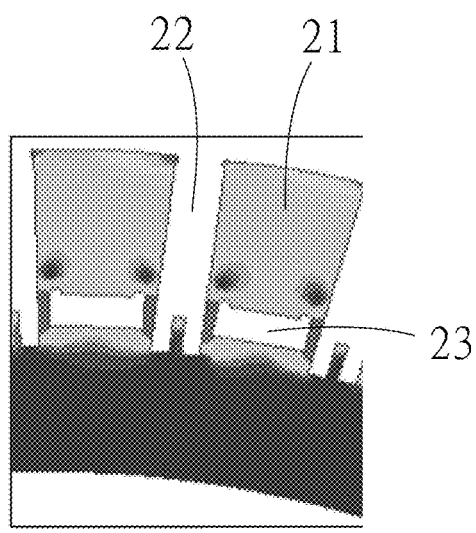
FIG. 4 is a magnetic flux density graph with the a/0 value of 0.45 according to a preferred embodiment of the present invention.
Figure 5:
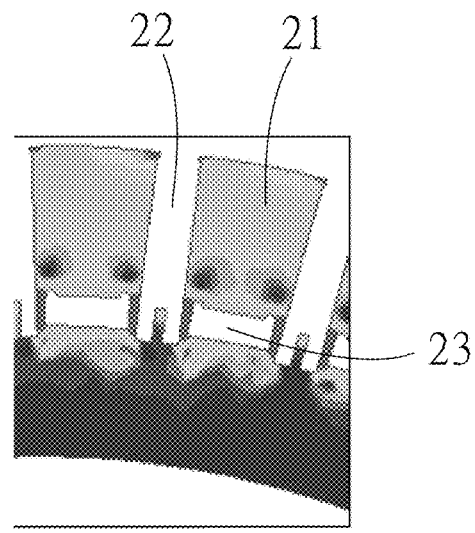
FIG. 5 is a magnetic path graph with the a/0 value of 0.45 according to a preferred embodiment of the present invention.

Each one of the first magnets (30) and each one of the second magnets (40) are arranged in the Halback magnetic ring array. In addition, each one of the first magnets (30) arranged radially is in a radial array, and each one of the second magnets (40) arranged along the circumferential direction of the body (21) is in a parallel array. Furthermore, in the parallel array, for a spacing (a) between one end of the center of curvature of each one of the second magnets (40) in the short axis direction away from the body (21) and the outer ring surface of the body (21), and for a diameter difference (β) between the inner diameter and the outer diameter of the body (21), a specific ratio relationship exists between the two. As shown in FIG. 3, the value of the spacing (α)/the diameter difference (β) is between 0.43 and 0.48, such that it is able to demonstrate the effects of increasing the torque (T), reducing the core loss (CL) and cog (CG). Despite that the most optimal ratio is different depending upon different needs, in general, the ratio of a value between 0.44 and 0.46 is preferred. However, the present invention is not limited to such values only. For example, when the objective is to increase the torque, then the value of α/β is preferably to be 0.45, and its magnetic flux density graph and magnetic path graph are as shown in FIG. 4 and FIG. 5. Moreover, when the objective is to reduce the cog, then the value of α/β is preferably to be 0.48, and its magnetic flux density graph is as shown in FIG. 6.

Figure 7:
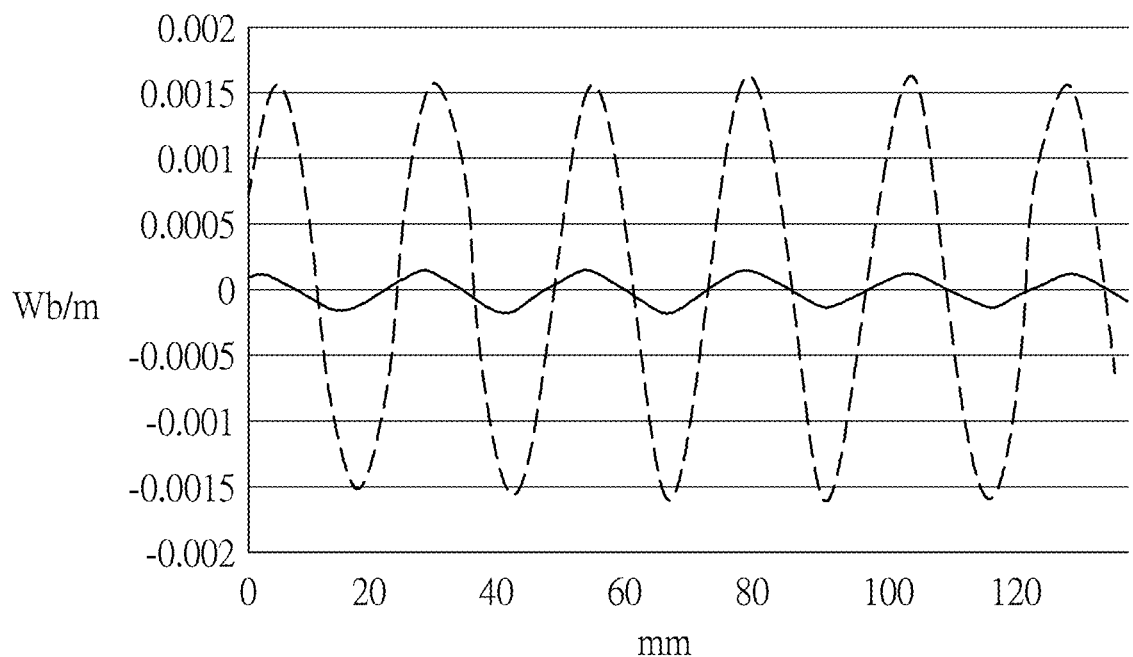
FIG. 7 is magnetic leakage comparison chart between a preferred embodiment of the present invention and the prior art.
Figure 8:
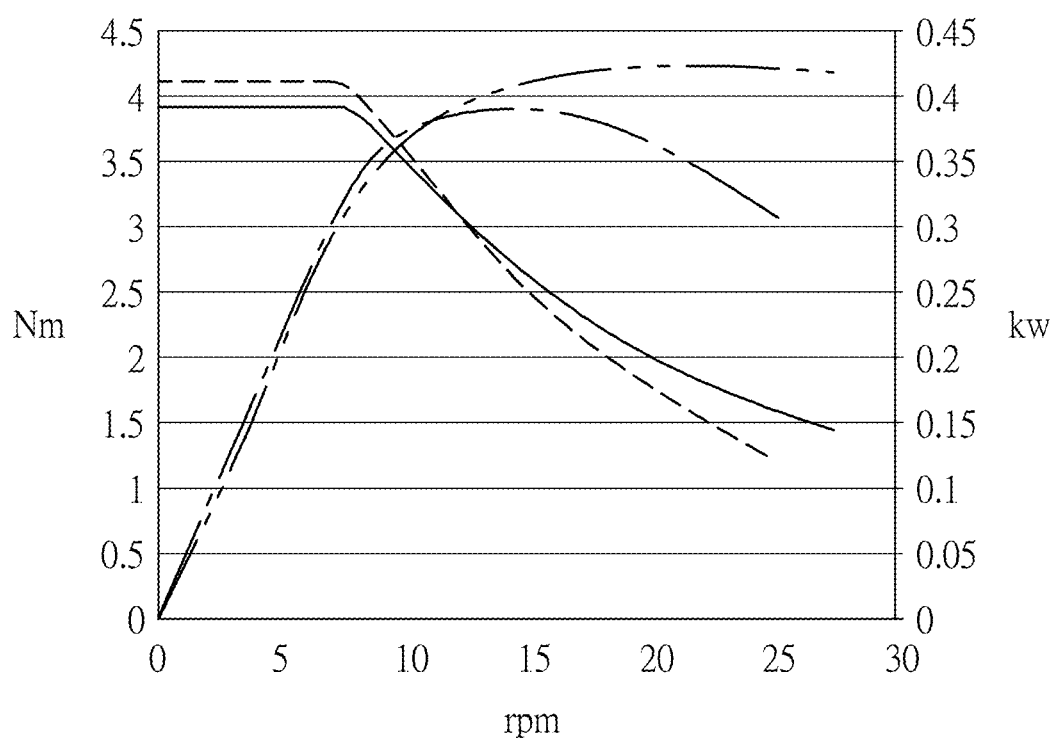
FIG. 8 is performance comparison chart between a preferred embodiment of the present invention and the prior art.

In terms of the technical effect, please refer to the comparison charts as shown in FIG. 7 and FIG. 8. The solid line shown in the two charts refers to the present invention and the dotted line in the drawings refers to the prior art. From the magnetic leakage comparison chart of FIG. 7, it can be understood that regarding the effect of preventing magnetic leakage of the rotor apparatus (10) for a permanent-magnet motor is clearly superior to the prior art such that the output power and efficiency of the motor can be increased. From performance comparison chart of FIG. 8, it is also sufficient to prove that in comparison to the prior art, the rotor apparatus (10) for a permanent-magnet motor demonstrates superior performance. In view of the above, it is sufficient to prove that the technique provided by the present invention, in comparison to the prior art, is able to achieve significant improvement in the effects of increasing the motor torque, reducing the magnetic leakage and reducing the core loss.

What is claimed is:

1. A rotor apparatus for a permanent-magnet motor, comprising:
   a rotor having a body, the body being a ring body, a plurality of first slots spaced apart from each other and extended along a radial direction of the body and radially arranged on the body respectively and a plurality of second slots disposed between adjacent first slots and arranged along a circumferential direction of the body respectively;
   a plurality of first magnets inserted into each one of the first slots respectively;
   a plurality of second magnets inserted into each one of the second slots respectively;
   wherein a spacing between one side of each of the second magnets away from a center of curvature of the body and an outer ring edge of the body, and a diameter difference between an inner diameter and an outer diameter of the body, are configured in such way that a value of the spacing/the diameter difference is between 0.43 and 0.48;
   wherein a magnetic intensity of each one of the second magnets is smaller than a magnetic intensity of each one of the first magnets;
   wherein an innermost end of each said first magnet of said plurality of first magnets is located a distance from the inner diameter of the body that is greater than a distance that an innermost end of each said second magnet of said plurality of second magnets is located from the inner diameter of the body.

2. The rotor apparatus for a permanent-magnet motor according to claim 1, wherein each one of the first magnets and each one of the second magnets are of rectangular shapes, and a long axis of each one of the first magnets are arranged to be parallel with the radial direction of the body, and a long axis of each one of the second magnets are arranged to be perpendicular to the radial direction of the body.

3. The rotor apparatus for a permanent-magnet motor according to claim 2, wherein each one of second slots is of a rectangular shape identical to that of the second magnet.

4. The rotor apparatus for a permanent-magnet motor according to claim 3, wherein the rotor further comprises a plurality of alcoves indented inward on two ends of one side of a short axis of each one of the second slots and perpendicular to the long axis of each one of the second slots respectively.

5. The rotor apparatus for a permanent-magnet motor according to claim 2, wherein each one of the first slot extends inward from an outer ring of the body respectively and is of a length greater than the rectangular shape of each one of the first magnets.

6. The rotor apparatus for a permanent-magnet motor according to claim 5, wherein the rotor further comprises a plurality of supporting members protruded at an extended rear end of each one of the first slots and extended outward along the radial direction of the body respectively, and an extension length of each one of the supporting members is configured to be smaller than a difference between a length of each one of the first slots and a length of each one of the first magnets.

7. The rotor apparatus for a permanent-magnet motor according to claim 1, wherein the value of the spacing/the diameter difference is between 0.44 and 0.46.

8. The rotor apparatus for a permanent-magnet motor according to claim 7, wherein each one of the first magnets and each one of the second magnets are of rectangular shapes, and a long axis of each one of the first magnets are arranged to be parallel with the radial direction of the body, and a long axis of each one of the second magnets are arranged to be perpendicular to the radial direction of the body.

9. The rotor apparatus for a permanent-magnet motor according to claim 8, wherein each one of second slots is of a rectangular shape identical to that of the second magnet.

10. The rotor apparatus for a permanent-magnet motor according to claim 9, wherein the rotor further comprises a plurality of alcoves indented inward on two ends of one side of a short axis of each one of the second slots and perpendicular to the long axis of each one of the second slots respectively.

11. The rotor apparatus for a permanent-magnet motor according to claim 8, wherein each one of the first slot extends inward from an outer ring of the body respectively and is of a length greater than the rectangular shape of each one of the first magnets.

12. The rotor apparatus for a permanent-magnet motor according to claim 11, wherein the rotor further comprises a plurality of supporting members protruded at an extended rear end of each one of the first slots and extended outward along the radial direction of the body respectively, and an extension length of each one of the supporting members is configured to be smaller than a difference between a length of each one of the first slots and a length of each one of the first magnets.

\* \* \* \* \*